Figure 1:
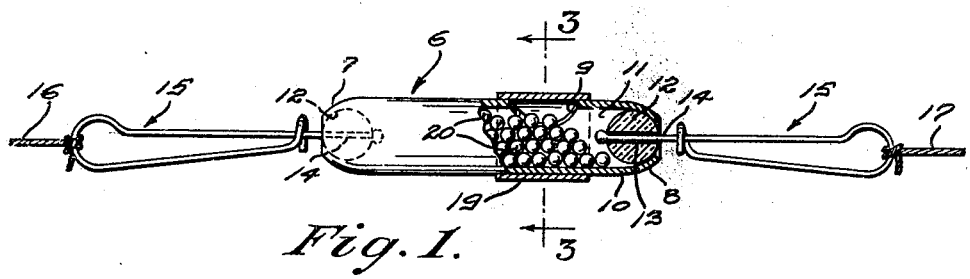

May 17, 1932. C. O. KAHLE 1,858,550
FISHING GEAR
Filed Feb. 5, 1930

INVENTOR
Clay O. Kahle
BY
Edward E. Barnes
ATTORNEY

Patented May 17, 1932

1,858,550

UNITED STATES PATENT OFFICE

CLAY O. KAHLE, OF SEATTLE, WASHINGTON; BELLE J. KAHLE ADMINISTRATRIX OF SAID CLAY O. KAHLE, DECEASED

FISHING GEAR

Application filed February 5, 1930. Serial No. 426,065.

This invention relates to fishing gear, and more particularly to the commonly termed "sinkers" utilized in submerging the tackle carried by a fishline below the water level.

The object of the invention, generally speaking, is the provision of an improved device of this character adapted to be readily assembled with or removed from the line and incorporating means for adjustably accommodating the same to the tackle submergence desired.

A further object resides in the provision of novel means whereby the sinker may, if desired, replace such coupling mechanism as has heretofore, in addition to the ordinary suspension of a weight, been required.

The foregoing and further objects and advantages relative to the elimination of friction, excessive drag, and such, will, it is believed, become apparent in the following description.

The invention resides in a novel barrel housing interconnecting, through ball and socket joints, a fishline and tackle, providing a recess and closure thereto accommodating the insertion of selective varying weight charges, the invention consisting in the novel construction, adaptation and combination of cooperative parts as will be hereinafter described, and specifically set forth in the claims annexed thereto.

In the drawings,—

Figure 2:
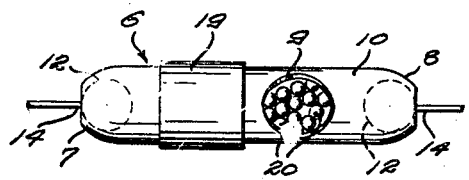
Figure 3:
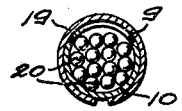
Figure 4:
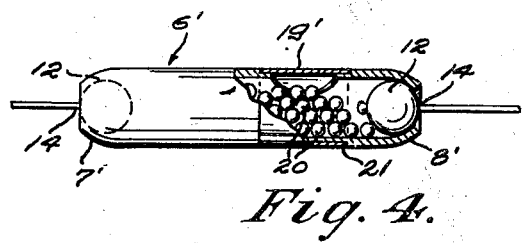
Figure 5:
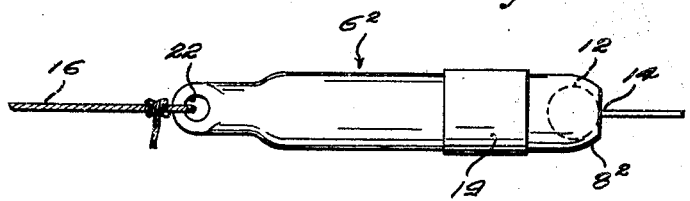

Figure 1 indicates in side elevation, parts being broken away and shown in section, an embodiment of my preferred form of structure, the same being indicated as securing associated line and tackle, one to the other. Fig. 2 is a top plan view of the same, the encased recess shown in Fig. 1 being represented with the feed aperture thereto exposed. Fig. 3 is a transverse vertical section, taken substantially on line 3—3 of Fig. 1. Fig. 4 indicates in side elevation, with parts being broken away and in section, a modified closure construction, while Fig. 5 is a side elevation of a still further modification.

Reference being had to the preferred form illustrated in Figs. 1–3, inclusive, the numeral 6 represents a barrel-shaped tubing having end extremities crimped to form converging socket extremities 7, 8, and as illustrated, providing an annular opening 9 communicating through the wall 10 with the recessed interior 11.

Within said sockets, bead elements 12 seat for swivel movement, engaging, through bore 13, the shank 14 of looped wire elements 15, the latter adapted to the securement of line extremities 16, 17 thereto. Said beads are, or may be of glass, and preferably of ball-shaped configuration, although semi-spherical beads of steel or other suitable material might as readily be utilized.

Said opening 9 referred to is normally encased by a closure comprising a cylindrical ring 19 adapted to sleeved engagement over the wall surface 10.

Within the recess of said barrel, as by aperture 9, plural weight means such as lead shot 20 may be inserted to adjustably determine the declination of the same with respect to the line origin.

In modified structure therefrom, Fig. 4, I contemplate the closure referred to as a metallic spring sleeve $19^1$ arranged to be sprung about the barrel $6^1$ and within a peripherally disposed groove providing flange portions 21 for engaging the sleeve.

The further modified form illustrated comprises a tubing $6^2$ suitably crushed or swaged adjacent one end, an annulet 22 being struck therefrom and the opposite end socketed, as at $8^2$ for the reception therein of a suitable ball structure 12.

Sleeve 19 acts in the manner described, as a closure to a suitable slot opening.

In operation, the clip is withdrawn from slot opening 9 and a plurality of shot inserted to provide the weight desired wherewith sleeve 19 is re-inserted over the opening.

An operator may readily increase or decrease the "sinker" weight without removing the same from the line, dependent upon the speed of the craft and depth of the water, as characterized by the normal habitat of various fish.

While the invention is preferably drawn to adjustable weight adapted cooperatively with socket extremities in providing a more efficient form of fishing gear, the invention might as readily be used in varying modifications, of which selected forms only have been illustrated. Hence, I do not wish to be taken as confining myself thereto, except as limited by the scope of the claims hereto annexed.

What I claim is:—

1. In fishing gear, the combination with a barrel housing having the opposite ends socketed to engage spherical beads journaled for rotative movement therein, said beads having means to respectively engage extremities of complementary fishline and tackle, of a recess provided in said barrel, a feed aperture for inserting weight charges to said recess, and closure means encasing said barrel for sealing the aperture.

2. In fishing gear, the combination with a housing having opposite ends socketed and arranged to engage balls for swivel movement therein, links projecting axially through said balls for rotative movement, and means carried by said links for respectively engaging a complementary fishline and tackle, of a recess provided in said housing, a feed aperture for inserting plural selective weight charges to said recess, and slidable closure means encasing said housing for sealing the aperture.

3. In fishing gear, a housing having means to secure the same in swivel engagement between a fishline and the tackle therefor, said means including a ball journaled for oscillatory activity in an end of said housing, and means to regulate the effective weight of said housing in submerging said tackle.

4. In fishing gear, the combination with a barrel housing having the opposite ends socketed to engage spherical beads journaled for rotative movement therein, said beads having means to respectively engage extremities of complementary fishline and tackle, of a recess provided in said barrel, and means to insert and retain selective weight charges in said recess.

5. In fishing gear, the combination with a housing having the opposite ends socketed to engage spherical beads journaled for rotative movement therein, said beads having means for connecting the same with respect to a fishline and the tackle therefor, of means for regulating the effective weight of said housing in submerging the tackle.

Signed at Seattle, Washington, this 29th day of January, 1930.

CLAY O. KAHLE.